(12) United States Patent
Yang et al.

(10) Patent No.: US 11,473,222 B2
(45) Date of Patent: Oct. 18, 2022

(54) COPPER ION-COMPLEXED POLY GAMMA-GLUTAMIC ACID/CHITOSAN/COTTON BLENDED ANTIBACTERIAL KNITTED FABRIC AND PREPARATION METHOD THEREOF

(71) Applicant: Qufu Normal University, Shandong (CN)

(72) Inventors: Ge Yang, Shandong (CN); Ruixia Gao, Shandong (CN); Chengchuan Che, Shandong (CN); Jinfeng Liu, Shandong (CN); Zhijin Gong, Shandong (CN); Yang Sun, Shandong (CN); Qi Chen, Shandong (CN)

(73) Assignee: Qufu Normal University, Shandong (CN)

( * ) Notice: Subject to any disclaimer, the term of this patent is extended or adjusted under 35 U.S.C. 154(b) by 0 days.

(21) Appl. No.: 17/305,174

(22) Filed: Jul. 1, 2021

(65) Prior Publication Data

US 2022/0090303 A1 Mar. 24, 2022

(30) Foreign Application Priority Data

Sep. 21, 2020 (CN) .......................... 202010993408.9

(51) Int. Cl.
| | | |
|---|---|---|
| *D01D 1/02* | (2006.01) | |
| *D01D 5/12* | (2006.01) | |
| *D01D 10/06* | (2006.01) | |
| *D04B 37/06* | (2006.01) | |
| *G05B 19/4093* | (2006.01) | |
| *D02G 3/44* | (2006.01) | |
| *A01P 1/00* | (2006.01) | |
| *A01N 25/34* | (2006.01) | |
| *A01N 55/02* | (2006.01) | |
| *D01F 1/10* | (2006.01) | |
| *D01F 8/02* | (2006.01) | |
| *D01F 8/12* | (2006.01) | |
| *D01F 8/18* | (2006.01) | |
| *D02G 3/04* | (2006.01) | |
| *D04B 21/16* | (2006.01) | |
| *A01N 25/10* | (2006.01) | |
| *A01N 59/20* | (2006.01) | |
| *D01D 5/06* | (2006.01) | |

(52) U.S. Cl.
CPC .............. *D02G 3/449* (2013.01); *A01N 25/10* (2013.01); *A01N 25/34* (2013.01); *A01N 55/02* (2013.01); *A01N 59/20* (2013.01); *A01P 1/00* (2021.08); *D01D 5/06* (2013.01); *D01F 1/10* (2013.01); *D01F 1/103* (2013.01); *D01F 8/02* (2013.01); *D01F 8/12* (2013.01); *D01F 8/18* (2013.01); *D02G 3/04* (2013.01); *D04B 21/16* (2013.01); *G05B 2219/45194* (2013.01)

(58) Field of Classification Search
CPC . D01D 1/02; D01D 5/06; D01D 10/06; D01F 1/103; D02G 3/04; D02G 3/449; D04B 21/16; D04B 37/06; G05B 19/4093; G05B 2219/45194
USPC ......... 264/103, 184, 186, 203, 178 F, 210.6, 264/210.8, 211, 211.14, 211.15, 233; 66/1 R, 231; 700/141
See application file for complete search history.

(56) References Cited

U.S. PATENT DOCUMENTS

| | | | |
|---|---|---|---|
| 2010/0055437 A1* | 3/2010 | Fink .................. | D01F 1/103 428/221 |
| 2022/0090303 A1 | 3/2022 | Yang et al. | |

FOREIGN PATENT DOCUMENTS

| | | | |
|---|---|---|---|
| CN | 101250759 B | 9/2010 | |
| CN | 105887242 A | 8/2016 | |
| CN | 112127013 B | 2/2022 | |
| KR | 1020200021007 A * | 2/2020 | ............... D01D 1/02 |

OTHER PUBLICATIONS

Translation of KR-1020200021007-A (published on Feb. 27, 2020).*
Kousaku Ohkawa et al., Self-assembling capsule and fiber formations of polyion complexes of chitosan and poly(a,L-glutamic acid), Macromol. Rapid Commun, 223-225 (2000).
Office Action issued in Chinese Patent Application No. 202010993408. 9, dated Nov. 3, 2021.
Notification to Grant Patent Right for Invention issued in Chinese Patent Application No. 202010993408.9, dated Jan. 26, 2022.

* cited by examiner

*Primary Examiner* — Leo B Tentoni
(74) *Attorney, Agent, or Firm* — Mark T. Vogelbacker; Eckert Seamans Cherin & Mellott, LLC

(57) ABSTRACT

A copper ion-complexed poly gamma-glutamic acid (γ-PGA)/chitosan (CS)/cotton blended antibacterial knitted fabric and a preparation method includes chitosan that is crosslinked with poly gamma-glutamic acid, then a copper-ammonia complex ion solution is added to prepare a spinning solution. The spinning solution is wet spun and then stretched, washed with water, finished, washed with water, and dried to get copper ion-complexed poly gamma-glutamic acid/chitosan composite fibers. The blended antibacterial knitted fabric is then prepared by using cotton fiber yarns and the composite fibers. There is a very high coordination coefficient between carboxyl groups of gamma-PGA and amino groups of CS, so the structure is stable. Poly-gamma glutamic acid can be used as water-retaining agent and heavy metal ion adsorbent, which can increase the loading rate of copper ions.

8 Claims, 1 Drawing Sheet

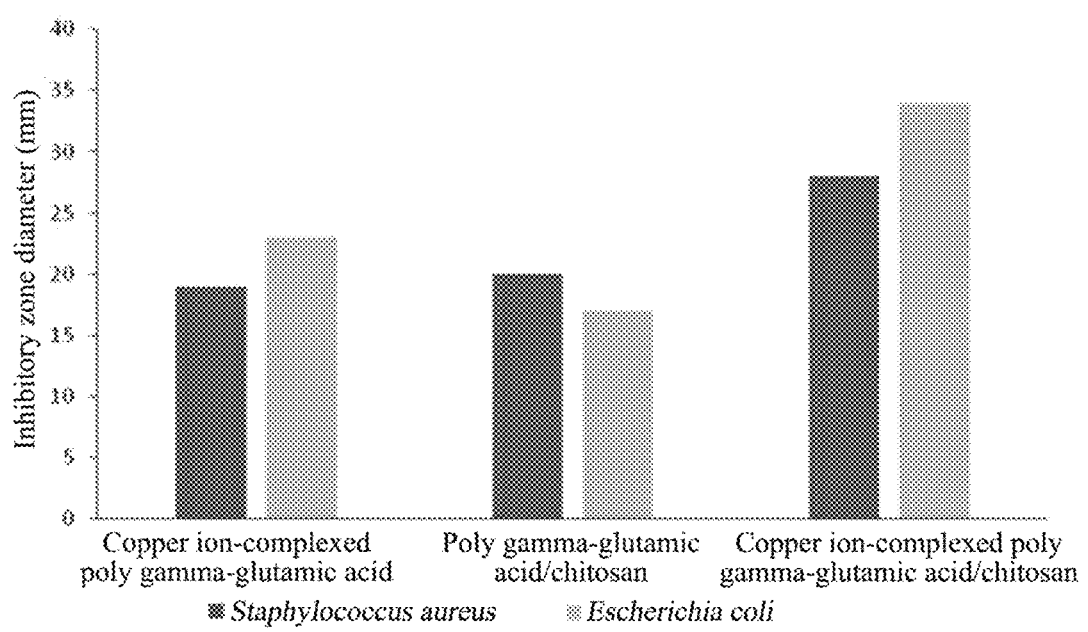

COPPER ION-COMPLEXED POLY GAMMA-GLUTAMIC ACID/CHITOSAN/COTTON BLENDED ANTIBACTERIAL KNITTED FABRIC AND PREPARATION METHOD THEREOF

CROSS REFERENCE TO RELATED APPLICATION

This patent application claims the benefit and priority of Chinese Patent Application No. 202010993408.9, filed on Sep. 21, 2020, the disclosure of which is incorporated by reference herein in its entirety as part of the present application.

TECHNICAL FIELD

The present disclosure relates to the field of functional fabrics, and specifically relates to a copper ion-complexed poly gamma-glutamic acid (γ-PGA)/chitosan (CS)/cotton blended antibacterial knitted fabric and a preparation method thereof.

BACKGROUND ART

Chitosan, a kind of natural macromolecular compound, is a positively charged natural alkaline polysaccharide obtained through the deacetylation of chitin, which is abundant in shells of shrimps and crabs. Chitosan not only has excellent biocompatibility, biodegradability and nontoxicity, but also has excellent antibacterial properties, so it can inhibit the growth of some pathogenic microorganisms (e.g., *Escherichia coli* and *Staphylococcus aureus*). The biodegradability of chitosan also helps to prevent the pollution of the environment after its products are discarded and improves the microecological properties of soil. Chitosan is positively charged, thus it can be crosslinked with poly gamma-glutamic acid that is negatively charged.

Poly gamma-glutamic acid, known as γ-PGA for short, is a non-ribosomal peptide formed by the linkage of γ-glutamyl bonds of L- and D-glutamic acid monomers under the catalysis of enzymes, in which there are a large amount of side chain carboxyl groups on the molecular chain, enabling the formation of hydrogen bonds within or between molecules. Therefore, it has biodegradability, easy modificability, water retention capacity, solubility, and slow-release property.

Chitosan fibers on the market today are high in cost and have poor spinnability, and their antibacterial properties are interfered by various factors such as PH, metal ions, deacetylation degree, molecular weight and the like. In addition, due to the effects of complex metabolic products of microbes and varied growing environment, chitosan fibers mainly exhibit inhibitory properties, while without bactericidal activities. Cotton fibers with good spinnability and excellent performance for clothing are mixed with chitosan fibers to improve the strength of cotton web, and confer certain inhibitory properties to the blended yarns, thus reducing the cost. However, raw cotton contains 4%-12% of the associated organisms, which exactly provide carbon source, nitrogen source, inorganic salts and some growth factors for the growth of bacteria, while chitosan fibers are bound in textiles and cannot be dissolved easily, which greatly promotes the reproduction of bacteria and reduces the inhibitory rate of chitosan fibers, and the inhibitory effect may be even lost completely after a while. Chinese Patent CN101250759B discloses a medical chitosan fiber in the textile processing field and a preparation method thereof. In the preparation method, chitosan fibers are activated with 0.1%4% of silver sodium phosphate so that the produced chitosan fibers contain silver ions. Silver ions can kill or inhibit the bacteria, but silver is not an essential trace element for human body. Moreover, as a heavy metal element, silver is potentially toxic to humans. In addition, silver ions are chemically reactive and sensitive to light and heat; especially after a long time of ultraviolet radiation, they may be reduced to black elemental silver, which not only affect the antibacterial properties of chitosan fibers and their products, but also affect the appearance of white or light colour products, thus greatly limiting the applications.

SUMMARY

The present disclosure is intended to provide a copper ion-complexed poly gamma-glutamic acid (γ-PGA)/chitosan (CS)/cotton blended antibacterial knitted fabric.

The present disclosure also provides a preparation method of the copper ion-complexed poly gamma-glutamic acid (γ-PGA)/chitosan (CS)/cotton blended antibacterial knitted fabric, in which the blended antibacterial knitted fabric is prepared by using cotton fiber yarns and the composite fiber yarns so as to improve the antibacterial activity of chitosan.

To achieve the above objectives, the present disclosure employs the following technical schemes:

The present disclosure provides a copper ion-complexed poly gamma-glutamic acid/chitosan/cotton blended antibacterial knitted fabric, the knitted fabric is prepared as below: chitosan is crosslinked with poly gamma-glutamic acid, then a copper-ammonia complex ion solution is added to prepare a spinning solution; the spinning solution is wet spun and then stretched, washed with water, finished, washed with water, and dried to get copper ion-complexed poly gamma-glutamic acid/chitosan composite fibers, then the blended antibacterial knitted fabric is prepared by using cotton fiber yarns and the composite fibers.

The present disclosure also provides a preparation method of the copper ion-complexed poly gamma-glutamic acid/chitosan/cotton blended antibacterial knitted fabric, specifically including the following steps:

(1) Aqueous ammonia is dropwise added into a copper salt solution to generate basic copper sulfate precipitates, aqueous ammonia is continually dropwise added until the precipitates are dissolved completely, to get a copper ammonia complex-ion solution;

(2) 20 mg chitosan is dissolved in 20 ml acetic acid solution, stirred uniformly at normal temperature and then diluted with deionized water to produce a chitosan solution; a solution of poly gamma-glutamic acid is dropwise added into an equal volume of the chitosan solution, stirred magnetically for well mixing; then 10 mg titanium dioxide, 3 mg anti-aging agent and 5 mg silane coupling agent are added and stirred magnetically; a copper ammonia complex-ion solution is added and centrifuged to get a spinning stock solution, which is wet spun at 60° C. to produce nascent fibers;

(3) The nascent fibers are stretched, washed with water, finished, washed with water and dried to get copper ion-complexed poly gamma-glutamic acid/chitosan composite fibers, and then the blended antibacterial knitted fabric is prepared by using cotton fiber yarns and the composite fibers.

Furthermore, in step (1), the copper salt is one of copper sulfate, copper chloride, copper nitrate, and copper acetate; and the concentration of the copper salt solution is 20 mg/ml.

Furthermore, in step (2), the volume percentage concentration of acetic acid in the acetic acid solution is 1%.

Furthermore, in step (2), the concentration of the solution of poly gamma-glutamic acid is 2 mg/ml, the solvent is ultrapure water; the concentration of the diluted chitosan solution is 2 mg/ml; and the deacetylation degree of the chitosan is 80.0-95.0.

Furthermore, in step (2), the anti-aging agent is PP-g-AN (polypropylene-acrylonitrile graft copolymer); the grafting rate of the PP-g-AN is 15%, and its molecular weight is 40 kDa.

Furthermore, in step (2), the time for the first magnetic stirring is 30 min; the time for the second magnetic stirring is 2 h; and the time for centrifugation by a centrifuge is 40 min.

Furthermore, in step (2), the parameters for wet spinning are: at a pressure of 0.1-0.3 MPa, the spinning solution is extruded through a metering pump for spinning, the spinning temperature is 60° C., the number of holes in the spinneret plate is 50-200, the aperture of the holes is 60-120 μm, the draft ratio in the coagulation bath is 0.75-1.05, and the draft ratio for water washing is 1.1-2.0.

In the present disclosure, the blended antibacterial knitted fabric prepared by using the cotton fiber yarns and the composite fibers is specifically prepared as below: a fabric knitting pattern is plotted in a software, and imported into a knitting computer after working correctly; the pure cotton fiber yarns and the composite fiber yarns are counted, warps are then finished on a warping board, the yarns to be used are replaced on the yarn carrier to be used and the number of stitches is set; after drafting, denting and finishing, the handpiece is reset for setting the strokes, after then the fabric is started to be knitted formally; after the completion of the knitting, another section of strokes is set, and the fabric is cut off after completely leaving the cloth roller.

The poly gamma-glutamic acid used in the present disclosure is extracted by fermentation with *Bacillus licheniformis*, including the following steps:

a. A basal medium is weighed and dissolved to get a basal medium solution, then various ingredients for optimizing the medium are weighed into the basal medium solution and metered, and solid NaOH is then added to adjust pH to 7.5;

b. The medium is divided into conical flasks (50 ml for each flask) and sterilized at 100-150° C., then *Bacillus licheniformis* is inoculated into the medium at an inoculation amount of 2-10% and shake incubated at 30-50° C. for 3-7 days to get a fermentation solution;

c. The fermentation solution is centrifuged, the supernatant is taken and added into 2-7 times volume of ethyl alcohol to precipitate for 10-24 h, and then centrifuged; the resulting supernatant is precipitated once again with 2-6 times volume of ethyl alcohol and centrifuged; the precipitates are dried to a constant weight to get constant-weight samples;

d. The constant-weight samples are dissolved in distilled water and purified by dialysis to get purified samples;

e. The purified samples are dissolved in distilled water and spray-dried to produce poly gamma-glutamic acid powder.

In step (a) during the preparation of poly-gamma glutamic acid, the volume ratio of the optimized medium to the basal medium is 1:4.

The basal medium used in the present disclosure is composed of the following raw materials: tryptone 10 g/L, yeast extract 5 g/L, NaCl 10 g/L; and the optimize medium is composed of the following raw materials: NaCl 10-15 g/L, α-ketoglutaric acid 1.0-2.5 g/L, Mn (II) 0.02-0.1 g/L, L-glutamine 0.2-1.0 g/L, and glycerin 5-15 g/L.

In the preparation process of poly-gamma glutamic acid in the present disclosure, the operating parameters of spray-drying are: the maximum water evaporation is 50 kg/h, the inlet temperature is 200° C., the outlet temperature is 85° C., and the centrifugal spray head rotates mechanically at a rotating speed of 18000 r/min.

Compared to the prior art, the present disclosure has the following beneficial effects:

(1) Poly-gamma glutamic acid and chitosan used in the present disclosure are microbial fermentation extracts that are colorless, non-toxic, tasteless, and degradable, and there is a very high coordination coefficient between carboxyl groups of gamma-PGA and amino groups of CS, so the structure is stable. Poly-gamma glutamic acid is sticky, which can be used as water-retaining agent and heavy metal ion adsorbent, and can increase the loading rate of copper ions.

(2) In the present disclosure, chitosan and copper ions have synergistic inhibitory effects, and the final produced knitted fabric will have better antibacterial properties and strong antibacterial durability.

(3) By crosslinking and complexing, the knitted fabric prepared in the present disclosure overcomes the environmental and toxic problems caused by inorganic copper; because the produced blended knitted fabric itself has an efficient antibacterial function, no antibacterial finishing is required for its products, thus reducing the production cost, and it is biodegradable, with no pollution for the environment.

(4) Compared with addition of an antibacterial agent in the fabric, the antibacterial knitted fabric prepared in the present disclosure has more durable antibacterial effects, ensuring the natural style of the fabric, thus having the advantages of good comfort, omission of finishing, simple operation and ease of use.

BRIEF DESCRIPTION OF THE DRAWINGS

FIG. 1 is a diagram showing the testing results on the antibacterial capacities of the composite fibers produced according to the present disclosure.

DETAILED DESCRIPTION OF THE EMBODIMENTS

The specific implementation of the present disclosure will be illustrated by the following embodiments, but the contents protected in the present disclosure are not limited to this.

Embodiment 1

(1) Aqueous ammonia was dropwise added into a copper sulfate solution of 10 mg/ml, generating light-blue basic copper sulfate precipitates; aqueous ammonia was continually dropwise added until the precipitates were dissolved completely, getting a copper ammonia complex-ion solution;

(2) Chitosan was dissolved in an acetic acid solution at a volume concentration of 1%, stirred uniformly at normal temperature and then diluted with deionized water to produce a chitosan solution with a concentration of 2 mg/ml (the deacetylation degree was 85.0); a solution of poly gamma-glutamic acid was prepared and dropwise added into an equal volume of the chitosan solution, stirred magnetically for 30 min until well mixing; then 10 mg titanium dioxide, 3 mg anti-aging agent and 5 mg silane coupling agent were added and stirred magnetically for 2 h; a copper ammonia complex-ion solution was added and centrifuged for 40 min; the supernatant was removed and the precipitates were dissolved in 20 ml of 1% acetic acid solution to get a spinning stock solution, which was wet spun with the operating parameters specifically as below: at a pressure of 0.3 MPa, the spinning solution was extruded through a metering pump for spinning, the spinning temperature was 25° C., the number of holes in the spinneret plate was 200, the aperture of the holes was 120 μm, the draft ratio in the coagulation bath was 1.05, and the draft ratio for water washing was 2.0;

(3) The produced nascent fibers were stretched, washed with water, finished, washed with water and dried to get copper ion-complexed poly gamma-glutamic acid (γ-PGA)/chitosan (CS) composite fibers;

(4) A fabric knitting pattern was plotted in a software, and imported into a knitting computer after working correctly; the pure cotton fiber yarns and the composite fiber yarns were counted, warps were then finished on a warping board, the yarns to be used were replaced on the yarn carrier to be used and the number of stitches was set; after drafting, denting and finishing, the handpiece was reset for setting the strokes, after then the fabric was started to be knitted formally; after the completion of the knitting, another section of strokes was set, and the fabric was cut off after completely leaving the cloth roller.

Embodiment 2

(1) Aqueous ammonia was dropwise added into a copper chloride solution of 10 mg/ml, generating light-blue basic copper sulfate precipitates; aqueous ammonia was continually dropwise added until the precipitates were dissolved completely, getting a copper ammonia complex-ion solution;

(2) Chitosan was dissolved in an acetic acid solution at a volume concentration of 1%, stirred uniformly at normal temperature and then diluted with deionized water to produce a chitosan solution with a concentration of 2 mg/ml (the deacetylation degree was 95.0); a solution of poly gamma-glutamic acid was prepared and dropwise added into an equal volume of the chitosan solution, stirred magnetically for 30 min until well mixing; then 10 mg titanium dioxide, 3 mg anti-aging agent and 5 mg silane coupling agent were added and stirred magnetically for 2 h; a copper ammonia complex-ion solution was added and centrifuged for 40 min; the supernatant was removed and the precipitates were dissolved in 20 ml of 1% acetic acid solution to get a spinning stock solution, which was wet spun at 30° C., with the operating parameters specifically as below: at a pressure of 0.2 MPa, the spinning solution was extruded through a metering pump for spinning, the spinning temperature was 25° C., the number of holes in the spinneret plate was 100, the aperture of the holes was 100 μm, the draft ratio in the coagulation bath was 1.0, and the draft ratio for water washing was 1.5;

(3) The produced nascent fibers were stretched, washed with water, finished, washed with water and dried to get copper ion-complexed poly gamma-glutamic acid (γ-PGA)/chitosan (CS) composite fibers;

(4) A fabric knitting pattern was plotted in a software, and imported into a knitting computer after working correctly; the pure cotton fiber yarns and the composite fiber yarns were counted, warps were then finished on a warping board, the yarns to be used were replaced on the yarn carrier to be used and the number of stitches was set; after drafting, denting and finishing, the handpiece was reset for setting the strokes, after then the fabric was started to be knitted formally; after the completion of the knitting, another section of strokes was set, and the fabric was cut off after completely leaving the cloth roller.

Embodiment 3

(1) Aqueous ammonia was dropwise added into a copper nitrate solution of 10 mg/ml, generating light-blue basic copper sulfate precipitates; aqueous ammonia was continually dropwise added until the precipitates were dissolved completely, getting a copper ammonia complex-ion solution;

(2) Chitosan was dissolved in an acetic acid solution at a volume concentration of 1%, stirred uniformly at normal temperature and then diluted with deionized water to produce a chitosan solution with a concentration of 2 mg/ml (the deacetylation degree was 80.0); a solution of poly gamma-glutamic acid was prepared and dropwise added into an equal volume of the chitosan solution, stirred magnetically for 30 min until well mixing; then 10 mg titanium dioxide, 3 mg anti-aging agent and 5 mg silane coupling agent were added and stirred magnetically for 2 h; a copper ammonia complex-ion solution was added and centrifuged for 40 min; the supernatant was removed and the precipitates were dissolved in 20 ml of 1% acetic acid solution to get a spinning stock solution, which was wet spun at 30° C., with the operating parameters specifically as below: at a pressure of 0.1 MPa, the spinning solution was extruded through a metering pump for spinning, the spinning temperature was 25° C., the number of holes in the spinneret plate was 50, the aperture of the holes was 60 μm, the draft ratio in the coagulation bath was 0.75, and the draft ratio for water washing was 1.1;

(3) The produced nascent fibers were stretched, washed with water, finished, washed with water and dried to get copper ion-complexed poly gamma-glutamic acid (γ-PGA)/chitosan (CS) composite fibers;

(4) A fabric knitting pattern was plotted in a software, and imported into a knitting computer after working correctly; the pure cotton fiber yarns and the composite fiber yarns were counted, warps were then finished on a warping board, the yarns to be used were replaced on the yarn carrier to be used and the number of stitches was set; after drafting, denting and finishing, the handpiece was reset for setting the strokes, after then the fabric was started to be knitted formally; after the completion of the knitting, another section of strokes was set, and the fabric was cut off after completely leaving the cloth roller.

Performance Test:

(1) *Staphylococcus aureus* and *Escherichia coli* were cultured as the tested strains to get a bacteria solution at the logarithmic growth phase; copper ion-complexed poly gamma-glutamic acid, poly gamma-glutamic acid/chitosan, copper ion-complexed poly gamma-glutamic acid/chitosan were dissolved to certain concentrations respectively, and determined for minimum inhibitory concentration (MIC) by a double dilution method. The results showed that, the inhibitory activity of copper ion-complexed poly gamma-glutamic acid (γ-PGA)/chitosan (CS) to *Staphylococcus aureus, streptococcus*, and *Escherichia coli* was superior to that of copper ion-complexed poly gamma-glutamic acid, or poly gamma-glutamic acid/chitosan.

TABLE 1

Inhibitory activity

| | MIC (μg/ml) | |
|---|---|---|
| Strains | Staphylococcus aureus | Escherichia coli |
| Copper ion-complexed poly gamma-glutamic acid | 500 | 290 |
| Poly gamma-glutamic acid/chitosan | 485 | 310 |
| Copper ion-complexed poly gamma-glutamic acid/chitosan | 390 | 200 |

(2) By using *Escherichia coli* and *Staphylococcus aureus* as the tested strains, a test for antibacterial ability was performed according to ISO 22196-2007 and QB/T 2591-2003 Standard. The spinning fibers of copper ion-complexed poly gamma-glutamic acid (γ-PGA)/chitosan (CS) produced in the present disclosure would be detected by Oxford cup method for the size of 24 h inhibitory zone of the tested fibers. The total number of bacterial colonies before and after the test were determined according to GB 4789.2-2010 Standard, during which the culture conditions for bacterial colonies were 37±1° C., and the relative humidity was greater than 90%. The resulting test data was processed statistically with SPSS13.0 software, with $P<0.05$ indicating that there was a significant difference, obtaining the size of 24 h inhibitory zone. It can be seen from FIG. 1 that, the inhibitory effect of copper ion-complexed poly gamma-glutamic acid (γ-PGA)/chitosan (CS) was superior to those of copper ion-complexed poly gamma-glutamic acid (γ-PGA) and poly gamma-glutamic acid (γ-PGA)/chitosan (CS), the inhibitory effect of copper ion-complexed poly gamma-glutamic acid (γ-PGA) to *Escherichia coli* was faintly superior to that of poly gamma-glutamic acid (γ-PGA)/chitosan (CS), and the inhibitory effect of poly gamma-glutamic acid (γ-PGA)/chitosan (CS) to *Staphylococcus aureus* was faintly superior to that of copper ion-complexed poly gamma-glutamic acid (γ-PGA).

(3) The copper ion-complexed poly gamma-glutamic acid/chitosan/cotton blended antibacterial knitted fabric was cut into pieces and ground with liquid nitrogen to get a suspension. By using *Escherichia coli* and *Staphylococcus aureus* as the tested strains, the antibacterial ability of the blended antibacterial knitted fabric produced in the present disclosure was detected. A control group 1 was set, in which a knitted fabric was prepared using copper ion-complexed poly gamma-glutamic acid (γ-PGA) by a preparation method essentially the same as that in embodiment 1. As shown in Table 2, the results showed that the knitted fabric had excellent inhibitory effects.

TABLE 2

Inhibitory effects of the knitted fabric

| Inhibitory of Staphylococcus aureus | Inhibitory rate of Escherichia coli | Inhibitory rate of Staphylococcus aureus |
|---|---|---|
| Embodiment 1 | 87.3% | 85.2% |
| Control group 1 | 63.1% | 60.5% |

It can be known from the above embodiments that, the copper ion-complexed poly gamma-glutamic acid (γ-PGA)/chitosan (CS)/cotton blended antibacterial knitted fabric prepared in the present disclosure has significant inhibitory effects, and the preparation method of the present disclosure is simple, the raw materials are low in cost. The copper ion-complexed poly gamma-glutamic acid (γ-PGA)/chitosan (CS)/cotton blended antibacterial knitted fabric prepared in the present disclosure can be widely applied in various fields.

What is claimed is:

1. A preparing method of copper ion-complexed poly gamma-glutamic acid/chitosan/cotton blended antibacterial knitted fabric, wherein, the knitted fabric is prepared as below: chitosan is crosslinked with poly gamma-glutamic acid, then a copper-ammonia complex ion solution is added to prepare a spinning solution; the spinning solution is wet spun and then stretched, washed with water, finished, washed with water, and dried to get copper ion-complexed poly gamma-glutamic acid/chitosan composite fibers, then the blended antibacterial knitted fabric is prepared by using cotton fiber yarns and the composite fibers;

the method comprising the following steps:
(1) aqueous ammonia is dropwise added into a copper salt solution to generate basic copper sulfate precipitates, aqueous ammonia is continually dropwise added until the precipitates are dissolved completely, to get a copper ammonia complex-ion solution;
(2) 20 mg chitosan is dissolved in 20 ml acetic acid solution, stirred uniformly at normal temperature and then diluted with deionized water to produce a chitosan solution; a solution of poly gamma-glutamic acid is dropwise added into an equal volume of the chitosan solution, stirred magnetically for well mixing; then 10 mg titanium dioxide, 3 mg anti-aging agent and 5 mg silane coupling agent are added and stirred magnetically; a copper ammonia complex-ion solution is added and centrifuged to get a spinning stock solution, which is wet spun at 60° C. to produce nascent fibers;
(3) the nascent fibers are stretched, washed with water, finished, washed with water and dried to get copper ion-complexed poly gamma-glutamic acid/chitosan composite fibers, and then the blended antibacterial knitted fabric is prepared by using cotton fiber yarns and the composite fibers.

2. The preparation method according to claim 1, wherein, in step (1), the copper salt is one of copper sulfate, copper chloride, copper nitrate, and copper acetate;
and the concentration of the copper salt solution is 20 mg/mL.

3. The preparation method according to claim 1, wherein, in step (2), the volume percentage concentration of acetic acid in the acetic acid solution is 1%.

4. The preparation method according to claim 1, wherein, in step (2), the concentration of the solution of poly gamma-glutamic acid is 2 mg/mL; the concentration of the diluted chitosan solution is 2 mg/mL; and the deacetylation degree of the chitosan is 80.0-95.0.

5. The preparation method according to claim 1, wherein, in step (2), the anti-aging agent is PP-g-AN (polypropylene-acrylonitrile graft copolymer); the grafting rate of the PP-g-AN is 15%, and its molecular weight is 40 kDa.

6. The preparation method of the composite fibers according to claim 1, wherein, in step (2), the time for the first magnetic stirring is 30 min; the time for the second magnetic stirring is 2 h; and the time for centrifugation by a centrifuge is 40 min.

7. The preparation method according to claim 1, wherein, in step (2), the parameters for wet spinning are: at a pressure of 0.1-0.3 MPa, the spinning solution is extruded through a metering pump for spinning, the spinning temperature is 60°

C., the number of holes in the spinneret plate is 50-200, the aperture of the holes is 60-120 μm, the draft ratio in the coagulation bath is 0.75-1.05, and the draft ratio for water washing is 1.1-2.0.

8. The preparation method according to claim 1, wherein: the blended antibacterial knitted fabric prepared by using the cotton fiber yarns and the composite fibers is specifically prepared as below: a fabric knitting pattern is plotted in a software, and imported into a knitting computer after working correctly; the pure cotton fiber yarns and the composite fiber yarns are counted, warps are then finished on a warping board, the yarns to be used are replaced on the yarn carrier to be used and the number of stitches is set; after drafting, denting and finishing, the handpiece is reset for setting the strokes, after then the fabric is started to be knitted formally; after the completion of the knitting, another section of strokes is set, and the fabric is cut off after completely leaving the cloth roller.

\* \* \* \* \*